United States Patent
Yim et al.

(10) Patent No.: US 7,649,608 B2
(45) Date of Patent: Jan. 19, 2010

(54) DRIVING CHIP, DISPLAY DEVICE HAVING THE SAME, AND METHOD OF MANUFACTURING THE DISPLAY DEVICE

(75) Inventors: Mi-Sook Yim, Seoul (KR); Ho-Min Kang, Suwon-si (KR); Won-Gu Cho, Seoul (KR); Seung-Jun Lee, Yongin-si (KR); Hoon-Kee Min, Seoul (KR); Jeong-Ho Hwang, Suwon-si (KR); Byoung-Hun Lee, Hwaseong-si (KR)

(73) Assignee: Samsung Electronics Co., Ltd. (KR)

( * ) Notice: Subject to any disclaimer, the term of this patent is extended or adjusted under 35 U.S.C. 154(b) by 377 days.

(21) Appl. No.: 11/367,259

(22) Filed: Mar. 3, 2006

(65) Prior Publication Data
US 2006/0197900 A1   Sep. 7, 2006

(30) Foreign Application Priority Data
Mar. 4, 2005   (KR) .................. 10-2005-0018227
Nov. 9, 2005   (KR) .................. 10-2005-0106795

(51) Int. Cl.
G02F 1/1345   (2006.01)
(52) U.S. Cl. .................. 349/150; 349/149; 349/151; 349/152
(58) Field of Classification Search .................. 349/150
See application file for complete search history.

(56) References Cited

U.S. PATENT DOCUMENTS

| | | | |
|---|---|---|---|
| 6,852,430 B2 * | 2/2005 | Bian et al. .................. | 428/831 |
| 6,853,430 B2 | 2/2005 | Murahashi et al. | |
| 6,963,385 B2 * | 11/2005 | Aruga et al. .................. | 349/151 |
| 7,141,877 B2 * | 11/2006 | Abe et al. .................. | 257/737 |
| 7,365,821 B2 * | 4/2008 | Dewa et al. .................. | 349/161 |
| 2003/0174273 A1 * | 9/2003 | Matsui et al. .................. | 349/151 |
| 2004/0150780 A1 * | 8/2004 | Imajo et al. .................. | 349/150 |
| 2004/0165138 A1 * | 8/2004 | Hwang et al. .................. | 349/152 |
| 2006/0005362 A1 * | 1/2006 | Arzt et al. .................. | 24/442 |
| 2006/0146214 A1 * | 7/2006 | Hwang et al. .................. | 349/43 |

FOREIGN PATENT DOCUMENTS

| | | |
|---|---|---|
| CN | 1436370 A | 8/2003 |
| CN | 1503831 A | 6/2004 |
| CN | 1532595 A | 9/2004 |

* cited by examiner

Primary Examiner—David Nelms
Assistant Examiner—Thanh-Nhan P Nguyen
(74) Attorney, Agent, or Firm—Cantor Colburn LLP

(57) ABSTRACT

A display device includes a display panel, a driving chip, and a non-conductive adhesive film. The display panel includes a pad member having a plurality of conductive pads. The driving chip includes a body and a plurality of bumps. The body has a driving circuit. The bumps are protruded from the body to make contact with the pads, respectively. The non-conductive adhesive film fixes the driving chip to the pad member. Therefore, a manufacturing cost is decreased, and a yield is increased.

20 Claims, 5 Drawing Sheets

DRIVING CHIP, DISPLAY DEVICE HAVING THE SAME, AND METHOD OF MANUFACTURING THE DISPLAY DEVICE

This application claims priority to Korean Patent Application No. 2005-18227, filed on Mar. 4, 2005, and Korean Patent Application No. 2005-106795, filed on Nov. 9, 2005 and all the benefits accruing therefrom under 35 U.S.C. §119, and the contents of which in their entireties are herein incorporated by reference.

BACKGROUND OF THE INVENTION

1. Field of the Invention

The present invention relates to a driving chip, a display device having the driving chip, and a method of manufacturing the display device. More particularly, the present invention relates to a driving chip, a display device having the driving chip attached to a display panel through a non-conductive adhesive film, and a method of manufacturing the display device.

2. Description of the Related Art

A liquid crystal display ("LCD") device, in general, displays an image using liquid crystal. The LCD device has various characteristics such as a thin thickness, a lightweight structure, low driving voltage, low power consumption, etc. The LCD device is used in various fields.

The LCD device includes an LCD panel and a driving chip. The LCD panel displays the image. The driving chip applies driving signals to the LCD panel. The driving chip applies the driving signals based on image signals that are provided from an exterior of the LCD device to the driving chip. A conventional driving chip is mounted on the LCD panel through a chip on glass ("COG") method. In the COG method, an anisotropic conductive film ("ACF") is interposed between the driving chip and the LCD panel. The ACF is heated and pressed so that the driving chip is electrically connected to the LCD panel.

The ACF includes an adhesive resin and a plurality of conductive balls. The conductive balls are dispersed within the adhesive resin. The adhesive resin includes a thermosetting resin or an ultraviolet light curable resin to fix the driving chip to the LCD panel. Each of the conductive balls includes a polymer bead and a metal layer coated on the polymer bead to electrically connect the driving chip to the LCD panel. The metal layer includes nickel, gold, etc.

However, the ACF including the conductive balls increases a manufacturing cost of the LCD device. In addition, the LCD device is manufactured through a pre-pressing process and a main-pressing process so that the manufacturing processes are complicated. In the pre-pressing process, the ACF is attached to the LCD panel. In the main-pressing process, the driving chip is attached to the ACF. In addition, the conductive balls are randomly disposed in the adhesive resin so that the driving chip may be electrically disconnected or electrically short-circuited from the LCD panel, thereby decreasing a yield.

BRIEF SUMMARY OF THE INVENTION

The present invention provides a display device having a driving chip attached to a display panel through a non-conductive adhesive film.

The present invention also provides a method of manufacturing the display device having the driving chip attached to the display panel through the non-conductive adhesive film.

The present invention also provides the driving chip for the display device.

Exemplary embodiments of a display device in accordance with the present invention include a display panel, a driving chip, and a non-conductive adhesive film. The display panel includes a pad member having a plurality of conductive pads. The driving chip includes a body and a plurality of bumps. The body has a driving circuit. The bumps are protruded from the body to make face-to-face contact with the pads, respectively. The non-conductive adhesive film fixes the driving chip to the pad member.

The non-conductive adhesive film may include a thermosetting resin. An elasticity of the non-conductive adhesive film may be about 1.0 GPa to about 6.0 GPa.

An exemplary method of manufacturing the exemplary display device is provided as follows. A non-conductive adhesive film is pre-pressed to a pad member of the display panel. The pad member includes a plurality of conductive pads. A driving chip is pre-pressed to the non-conductive adhesive film. The driving chip is main-pressed so that bumps of the driving chip make contact with the pads, respectively. Each of the bumps of the driving chip may make contact with each of the pads at a surface contact. The non-conductive adhesive film may be pre-pressed under a pressure of about 0.1 MPa to about 10 MPa. The driving chip may be pre-pressed under a pressure of about 0.1 MPa to about 10 MPa. The driving chip may be main-pressed under a pressure of about 30 MPa to about 150 MPa. The driving chip may be main-pressed for about 2 seconds to about 15 seconds.

Exemplary embodiments of the driving chip according to the present invention include a body having a driving circuit in a circuit region of the driving chip, and a plurality of bumps protruded from the body, each of the bumps including a metal layer in electrical contact with the driving circuit, each of the bumps located in the circuit region of the driving chip. The electrical contact between the metal layer of each of the bumps and the driving circuit occurs in a peripheral region of the driving chip. Because the bumps are located within the circuit region, a size of the driving chip is decreased.

According to the present invention, the driving chip is electrically connected to the display panel through the non-conductive adhesive film ("NCF") that does not have conductive particles. Therefore, a manufacturing cost of the display device is decreased.

BRIEF DESCRIPTION OF THE DRAWINGS

The above and other advantages of the present invention will become more apparent by describing in detail exemplary embodiments thereof with reference to the accompanying drawings, in which.

DETAILED DESCRIPTION OF THE INVENTION

Figure 1:
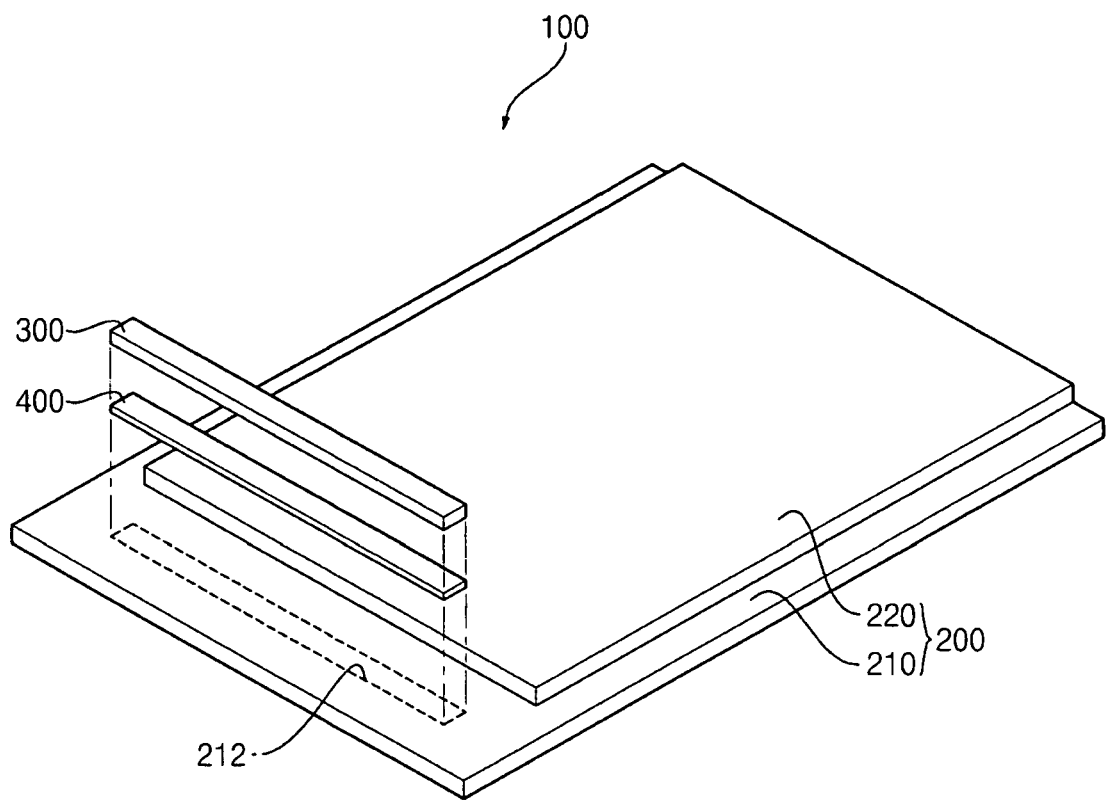
FIG. 1 is a perspective view showing an exemplary embodiment of a display device in accordance with the present invention.

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. In the drawings, the size and relative sizes of layers and regions may be exaggerated for clarity.

It will be understood that when an element or layer is referred to as being "on", "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numbers refer to like elements throughout. As used herein, the term "and/or" includes any and all combinations of one or more of the associated listed items.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the present invention.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the invention are described herein with reference to cross-section illustrations that are schematic illustrations of idealized embodiments (and intermediate structures) of the invention. As such, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of the invention.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, the present invention will be described in detail with reference to the accompanying drawings.

FIG. 1 is a perspective view showing an exemplary embodiment of a display device in accordance with the present invention.

Referring to FIG. 1, the display device 100 includes a display panel 200, a driving chip 300, and a non-conductive adhesive film ("NCF") 400. The display panel 200 displays an image. The driving chip 300 applies driving signals to the display panel 200. The driving chip 300 is fixed to the display panel 200 through the NCF 400.

The display panel 200 displays the image based on the driving signals from the driving chip 300. The display panel 200 includes a pad member 212 having a plurality of pads through which the driving chip 300 is electrically connected to the display panel 200. Each of the pads is electrically conductive.

The display panel 200 may include an LCD panel that has a first substrate 210, a second substrate 220, and a liquid crystal layer (not shown). The second substrate 220 corresponds to the first substrate 210. The liquid crystal layer (not shown) is interposed between the first and second substrates 210 and 220.

The first substrate 210 may include a thin film transistor ("TFT") substrate. The TFT substrate includes a plurality of thin film transistors ("TFTs") that are switching elements arranged in a matrix on the first substrate 210. For example, the first substrate 210 may include a glass. The TFT substrate may further include a plurality of gate lines formed parallel to each other in a first direction, and a plurality of data lines formed parallel to each other in a second direction, where the second direction may be substantially perpendicular to the first direction. While the data lines intersect the gate lines, they may be insulated therefrom. A source electrode of each of the TFTs is electrically connected to one of the data lines. A gate electrode of each of the TFTs is electrically connected to one of the gate lines. A drain electrode of each of the TFTs is electrically connected to a pixel electrode that includes a transparent conductive material. Examples of the transparent conductive material that can be used for the pixel electrode include indium tin oxide ("ITO"), tin oxide ("TO"), indium zinc oxide ("IZO"), zinc oxide ("ZO"), amorphous indium tin oxide ("a-ITO"), indium tin zinc oxide ("ITZO"), etc.

The second substrate 220 may include a color filter substrate that has a color filter, or a plurality of color filters, and a common electrode. The color filter preferably includes a red color filter portion, a green color filter portion, and a blue color filter portion, although other colors for the color filter portions are within the scope of these embodiments. The common electrode includes a transparent conductive material. Examples of the transparent conductive material that can be used for the common electrode include ITO, tin oxide TO, indium zinc oxide IZO, zinc oxide ZO, amorphous indium tin oxide a-ITO, indium tin zinc oxide ITZO, etc.

When each of the TFTs is turned on, such as by receiving a gate signal through the gate electrode, an electric field is formed between the pixel electrode on the first substrate 210, which receives a signal via the drain electrode, and the common electrode on the second substrate 220, which may receive a common voltage Vcom. Liquid crystal molecules within the liquid crystal layer (not shown) disposed between the first and second substrates 210 and 220 vary in arrangement in response to the electric field applied thereto, and thus a light transmittance of the liquid crystal layer (not shown) is changed, thereby displaying the image.

The driving chip 300 is attached to the pad member 212 located on the first substrate 210 of the display panel 200 through the NCF 400. The driving chip 300 applies the driving signals to the display panel 200. In particular, the first substrate 210 may have a display region corresponding to a display region of the second substrate 220, and a non-display region. The non-display region of the first substrate 210 may include an area of the first substrate 210 that extends beyond a periphery of the second substrate 220. In the illustrated embodiment, the first substrate 210 includes a generally rectangular shaped substrate having a first side, an opposite second side, a third side, and a fourth side opposite to the third side, although other shapes of the first substrate 210 are within the scope of these embodiments. The pad member 212 extends adjacent the first side and in a direction substantially parallel to the first side of the first substrate 210. When attached, the driving chip 300 and the NCF 400 likewise extend adjacent the first side and in a direction substantially parallel to the first side of the first substrate 210.

While only one pad member 212, and one corresponding driving chip 300 and NCF 400 are illustrated, the display device 100 may include multiple pad members 212 and corresponding driving chips 300 and NCFs 400.

The NCF 400 may include a thermosetting resin. An elasticity of the NCF 400 is about 1.0 GPa to about 6.0 GPa. It should be understood that the elastic modulus is calculated by dividing the stress by the strain of the material, and is defined in units of pascals, where, given the large values typical of the materials used herein, may also be defined in megapascals or gigapascals. A higher elastic modulus indicates a stiffer material.

The display device 100 is manufactured through a first pre-pressing process, a second pre-pressing process, and a main-pressing process. The NCF 400 is attached to the pad member 212 of the display panel 200 through the first pre-pressing process. The driving chip 300 is attached to the NCF 400 through the second pre-pressing process. The driving chip 300 is then pressed through the main-pressing process. If more than one driving chip 300 are to be employed as part of the display device 100, then the driving chips 300 may either be simultaneously applied using the above-described manufacturing process, or may be individually applied.

Figure 2:
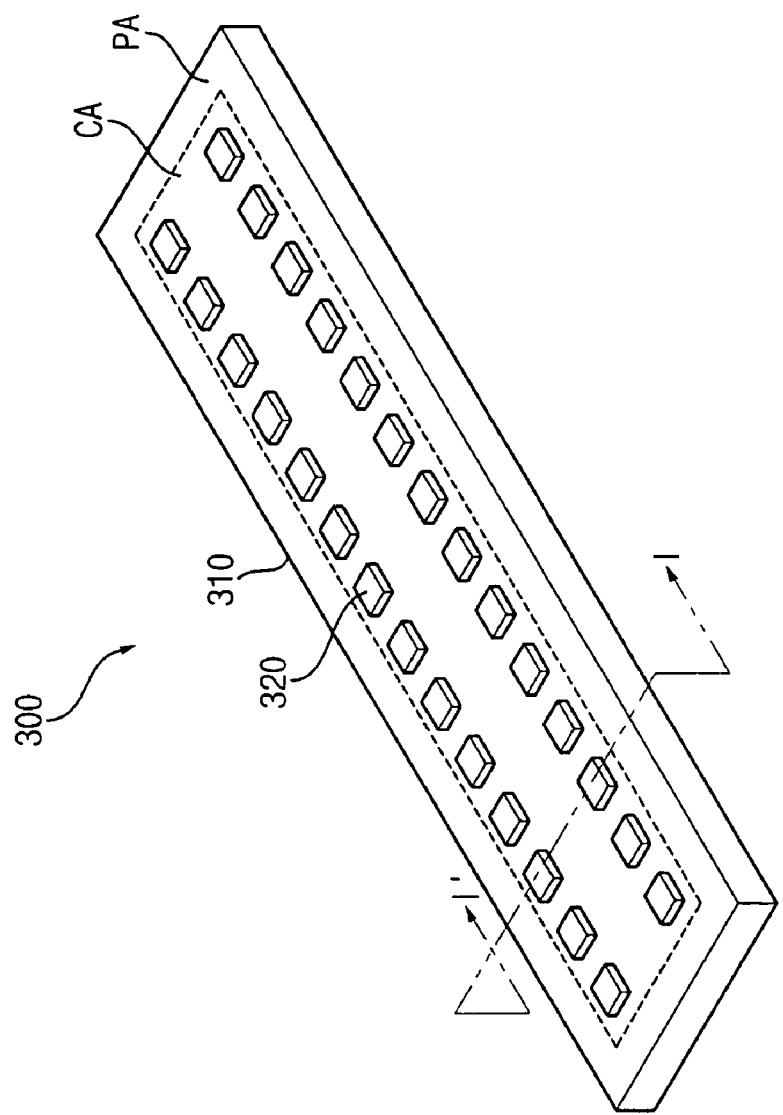
FIG. 2 is a perspective view showing an exemplary driving chip shown in FIG. 1.
Figure 3:
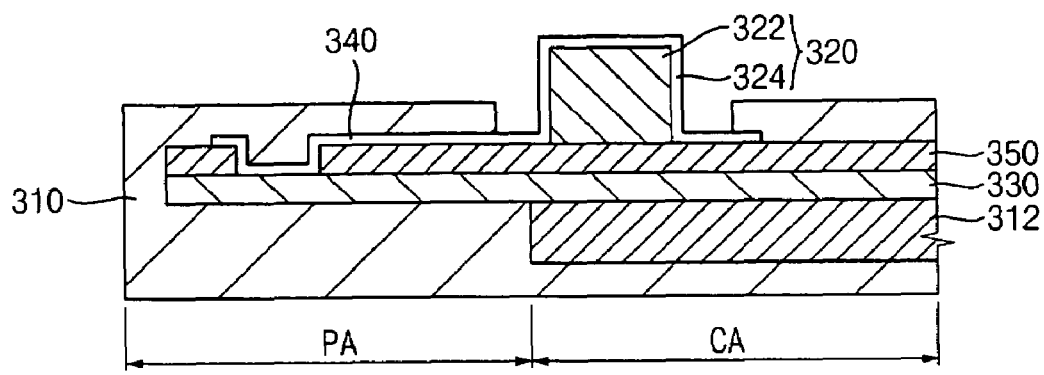
FIG. 3 is a cross-sectional view taken along line I-I' shown in FIG. 2.

FIG. 2 is a perspective view showing an exemplary driving chip shown in FIG. 1. FIG. 3 is a cross-sectional view taken along line I-I' shown in FIG. 2.

Referring to FIGS. 2 and 3, the driving chip 300 includes a body 310 and a plurality of bumps 320 that are protruded from the body 310. In the illustrated embodiment, the body 310 includes a first surface and an opposing second surface, where the bumps 320 protrude from the first surface of the body 310.

A driving circuit 312 is disposed within the body 310. The driving circuit 312 generates the driving signals based on the externally provided image signals. For example, the image signals may be provided by a signal controller to the driving chip 300. The driving circuit 312 is formed through a semiconductor manufacturing process such as a deposition process, a photolithography process, etc. The body 310 includes an insulating material to protect the driving circuit 312.

The driving chip 300 includes a circuit region CA and a peripheral region PA. The circuit region CA corresponds to the driving circuit 312. The peripheral region PA surrounds the circuit region CA. The bumps 320 are located in the circuit region CA to decrease a size of the driving chip 300.

The bumps 320 may have a substantially same height protruding from the first surface of the body 310. For example, the bumps 320 are arranged on the body 310 in at least two columns. The bumps 320 include input bumps for receiving the image signals and output bumps for outputting the driving signals. For example, the input bumps may receive the image signals from an exterior source, such as a signal controller, and the output bumps may output the driving signals to the first substrate 210 of the display panel 200. The driving circuit 312 may be electrically connected to the bumps 320 such that the driving circuit 312 receives the image signals from the input bumps, generates the driving signals based on the externally provided image signals, and passes the driving signals to the output bumps for outputting the driving signals to the first substrate 210 of the display panel 200.

Each of the bumps 320 includes an insulating layer 322 and a metal layer 324 on the insulating layer 322. Each of the bumps 320 may have a substantially rectangular-shaped cross-section as illustrated, however other cross-sectional shapes of the bumps 320 are within the scope of these embodiments. Each of the bumps 320 may include an outer face, which may be substantially planar, for enhancing a contact area with pads of the pad member 212, as will be further described below.

The insulating layer 322 may include an elastic material so that the driving chip 300 is easily combined with the display panel 200. For example, the insulating layer 322 may include, but is not limited to, polyimide ("PI"). The insulating layer 322 may also define the shape of the bumps 320. For example, the insulating layer 322 may have a protruding shape having a substantially planar face, where the protruding shape may have a cross-sectional shape corresponding to a shape of the pads of the pad member 212. It should be understood that the size and shape of the bumps 320 and the pads of the pad member 212 need not be the same, however, the shapes of the bumps 320 and the pads of the pad member 212 may be chosen to maximize electrical contact therebetween.

The metal layer 324 may include a highly conductive metal so that the driving chip 300 is electrically connected to the display panel 200. For example, the metal layer 324 may include gold. The bumps 320 having the insulating layer 322 and the metal layer 324 serve substantially the same function as the conductive balls of an anisotropic conductive film ("ACF").

The driving chip 300 may further include a pad layer 330 and a metal line 340. The pad layer 330 is electrically connected to the driving circuit 312 in the body 310, and extends toward the peripheral region PA. The pad layer 330 is electrically connected to the metal layer 324 of the bumps 320 through the metal line 340. As illustrated, the connection between the metal line 340 and the pad layer 330 may occur in the peripheral region PA.

The pad layer 330 includes a conductive material so that the driving circuit 312 is electrically connected to each of the bumps 320. For example, the pad layer 330 may include, for example, aluminum.

An end portion of the metal line 340 is electrically connected to the pad layer 330 in the peripheral region PA. Another end portion of the metal line 340 is electrically connected to the metal layer 324 of each of the bumps 320. For example, the metal line 340 may include, but is not limited to including, gold. The metal line 340 and the metal layer 324 may include a substantially same material, and may be made from a substantially same layer.

The driving chip 300 may further include a protecting layer 350 to protect the pad layer 330, where the protecting layer 350 may cover most of a top surface area of the pad layer 330. The protecting layer 350 may thus be disposed between the pad layer 330 and the metal line 340. The insulating layer 322 of the bumps 322 may also be formed on the protecting layer 350. The body 310 may surround the protecting layer 350 at locations where neither the insulating layer 322 nor the metal line 340 is disposed thereon. The protecting layer 350 may include a plurality of openings in the peripheral region PA through which the pad layer 330 is partially exposed so that the metal line 340 is electrically connected to the pad layer 330. The metal line 340 is formed at the locations of the openings in the protecting layer 350 so that the metal line 340 contacts the underlying pad layer 330. Thus, the pad layer 330 is electrically connected to the metal layer 324 of the bumps 320 through the metal line 340 that contacts the pad layer 330 through the openings in the protecting layer 350.

Figure 4:
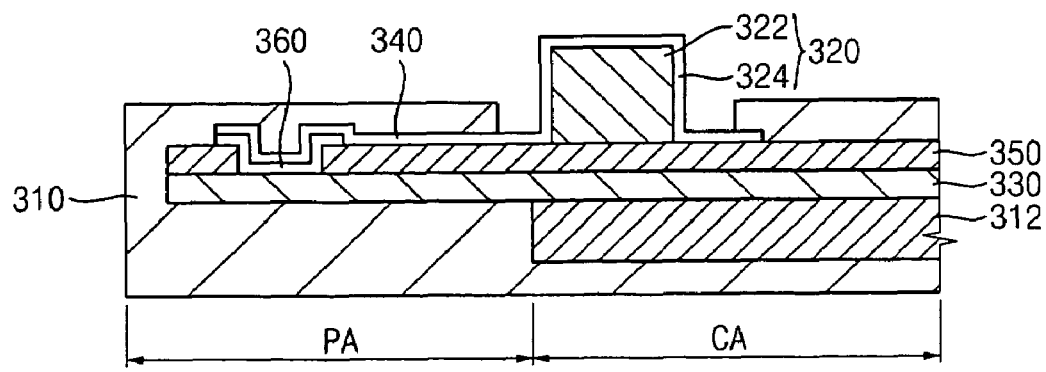
FIG. 4 is a cross-sectional view showing another exemplary embodiment of a driving chip in accordance with the present invention.

FIG. 4 is a cross-sectional view showing another exemplary embodiment of a driving chip in accordance with the present invention. The driving chip of FIG. 4 is substantially the same as in FIGS. 1 to 3 except for a connecting layer. Thus, the same reference numerals will be used to refer to the same or like parts as those described in FIGS. 1 to 3 and any further explanations concerning the same or like elements will be omitted.

Referring to FIG. 4, the driving chip 300 further includes a connecting layer 360 between the pad layer 330 and the metal line 340. The pad layer 330 is securely combined with the metal line 340 through the connecting layer 360. For example, when the pad layer 330 and the metal line 340 include aluminum and gold, respectively, the connecting layer 360 may include an alloy of titanium-tungsten. As illustrated, the connecting layer 360 may be disposed on the pad layer 330 within the openings formed in the protecting layer 350. The connecting layer 360 may also overlap sides of the openings in the protecting layer 350, as well as a top surface portion of the protecting layer 350 in the vicinity of the openings. Alternatively, the connecting layer 360 may be located only on the pad layer 330 within the openings, or only the pad layer 330 and the sides of the openings in the protecting layer 350.

Figure 5:
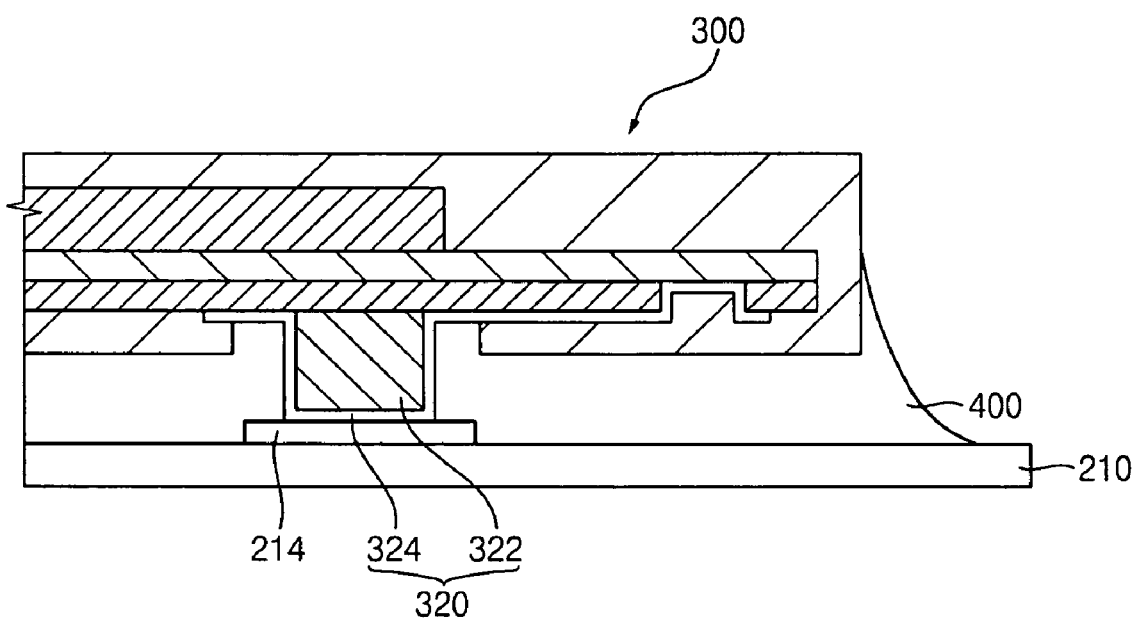
FIG. 5 is a cross-sectional view showing an exemplary display panel and an exemplary driving chip shown in FIG. 1.

FIG. 5 is a cross-sectional view showing an exemplary display panel and an exemplary driving chip shown in FIG. 1.

Referring to FIG. 5, the driving chip 300 is combined with the first substrate 210 of the display panel 200 through the NCF 400. The NCF 400 may include a thermosetting resin that is solidified by heat. The NCF 400 is heated and pressed so that the driving chip 300 is combined with and retained on the first substrate 210.

The first substrate 210 of the display panel 200 may further include a plurality of pads 214 of the pad member 212 through which the bumps 320 of the driving chip 300 are electrically connected to the first substrate 210. The pads 214 are electrically connected to the data and gate lines of the first substrate 210, respectively. The pads 214 may have an outer face that may be substantially planar. The outer face of the pads 214 are designed to make face-to-face contact with the outer face of the bumps 320 when the driving chip 300 is combined with the first substrate 210.

The bumps 320 of the driving chip 300 make contact, such as face-to-face contact, with the pads 214 of the first substrate 210 through the heating and pressing processes so that a contact area between each of the bumps 320 and each of the respective pads 214 is increased. When face-to-face contact between the pads 214 and the bumps 320 is achieved, image signals from an exterior source are passed from input bumps of the driving chip 300 to the driving circuit 312 to generate driving signals that are passed to the output bumps, and thus to the pads 214 and then to the gate and/or data lines of the first substrate 210. After the heating and pressing processes, the NCF 400 is solidified so that the driving chip 300 is fixed to the first substrate 210. Adjacent bumps 320 are electrically insulated from each other. In addition, adjacent pads 214 are electrically insulated from each other.

In FIGS. 1 to 5, the display panel 200 includes the LCD panel. Alternatively, the display panel 200 may include a plasma display panel ("PDP") device, an organic light emitting display ("OLED") device, etc.

Figure 6:
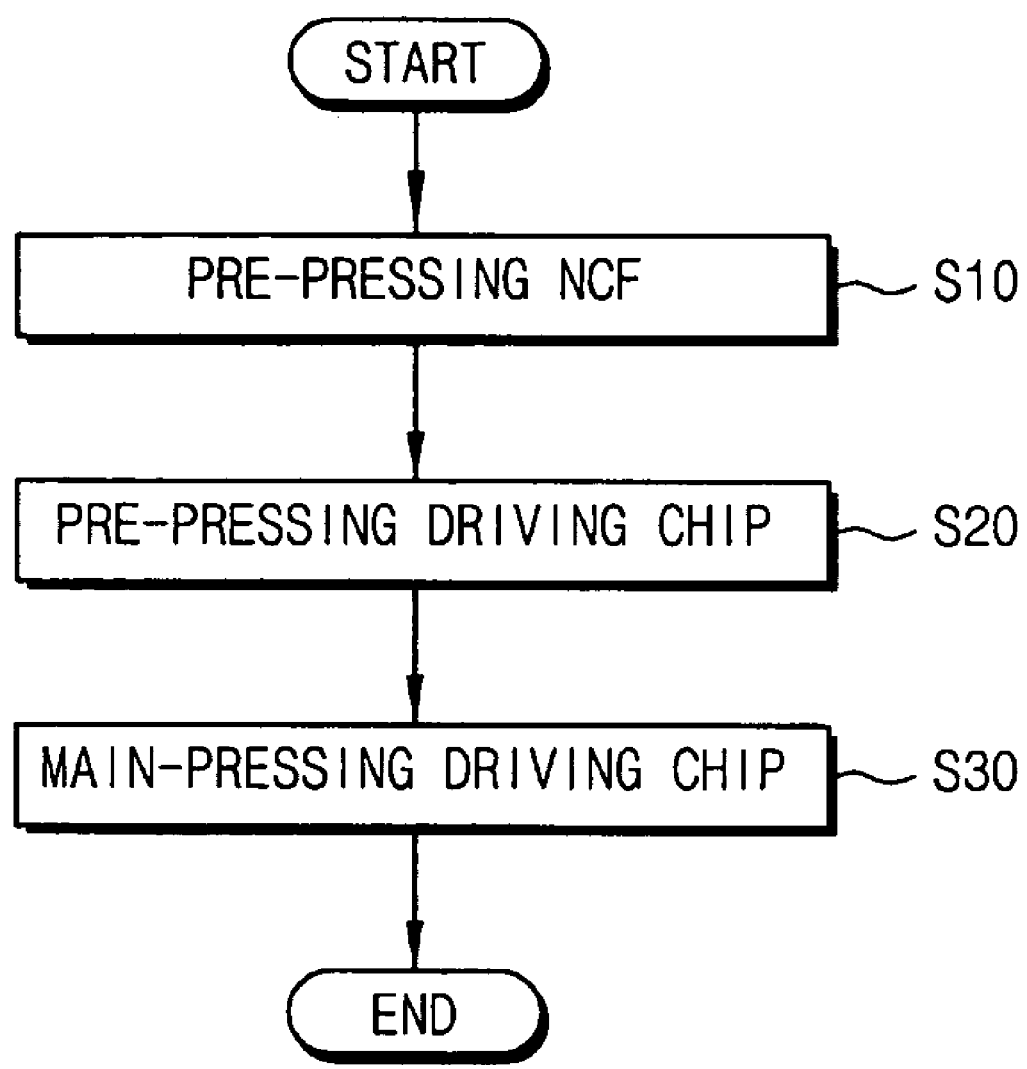
FIG. 6 is a flow chart showing an exemplary method of manufacturing the display device shown in FIG. 1.

FIG. 6 is a flow chart showing an exemplary method of manufacturing the exemplary display device shown in FIG. 1. It should be understood that a method of manufacturing a display device, where the display device includes the second exemplary embodiment of a driving chip 300 having the connecting layer 360 as shown in FIG. 4, may be substantially the same as the exemplary method described with respect to FIG. 6.

Referring to FIGS. 1, 5, and 6, an NCF 400 is pre-pressed to a pad member 212 of a first substrate 210 of a display panel 200, as represented by step S10. The pad member 212 includes a plurality of pads 214. For example, when the NCF 400 is pre-pressed under a pressure of about 0.1 MPa to about 10 Mpa, an elasticity of the NCF 400 is about 1.0 GPa to about 6.0 GPa.

Next, as shown by step S20, a driving chip 300 is pre-pressed to the NCF 400. The driving chip 300 is pre-pressed under a pressure of about 0.1 MPa to about 10 Mpa.

If the NCF 400 or the driving chip 300 is pre-pressed under a pressure of less than about 0.1 MPa, then the pressure may be insufficient and the NCF 400 may become detached from the display panel 200. In addition, if the NCF 400 or the driving chip 300 is pre-pressed under a pressure of more than about 10 MPa, then a material property such as the elasticity of the NCF 400 may be changed or the NCF 400 may be deformed. However, in FIGS. 1, 5, and 6, the NCF 400 and the driving chip 300 are pre-pressed under the pressure of about 0.1 MPa to about 10 MPa so that the NCF 400 is securely attached to the display panel 200, and the material property of the NCF 400 may not be adversely changed.

Then, as in step S30, the driving chip 300 is main-pressed so that the bumps 320 of the driving chip 300 make contact with the pads 214, respectively. For example, the driving chip 300 may be main-pressed under a pressure of about 30 MPa to about 150 MPa for about 2 seconds to about 15 seconds.

If the driving chip 300 is main-pressed under a pressure of less than about 30 MPa, a time period for making contact between the bumps 320 and the pads 214 must be increased, and the bumps 320 may not make contact with the pads 214. If the time period for the bumps 320 to make contact with the pads 214 is increased, then a resin that is interposed between the bumps 320 and the pads 214 may be solidified before the bumps 320 have a chance to make contact with the pads 214. If the resin remains between the bumps 320 and the pads 214, then the bumps 320 may not make contact with the pads 214. If the bumps 320 do not make contact with the pads 214, then an electrical connection is not made between the bumps 320 and the pads 214 and the driving signals based on the image signals may not be properly sent to the display panel 200. In addition, if the driving chip 300 is main-pressed under a pressure of more than about 15 MPa, then the metal layer 324 of the bumps 320 may become deformed, and the electrical connection between the bumps 320 and the pads 214 may be jeopardized. However, in FIGS. 1, 5, and 6, the driving chip 300 is main-pressed under the pressure of about 30 MPa to about 150 MPa so that the bumps 320 securely make contact with the pads 214, and the metal layer 324 of the bumps 320 may not be deformed.

The main-pressing process is performed using a pressing unit. The pressing unit may generate a heat to heat the driving chip 300. For example, a temperature of the pressing unit may be about 150° C. to about 250° C.

In the main-pressing process, if the temperature of the pressing unit is less than about 150° C., then an adhesive strength between the driving chip 300 and the NCF 400 may be decreased so that the driving chip 300 may become detached from the NCF 400. In addition, if the temperature of the pressing unit is more than about 250° C., then the resin of the NCF 400 may be too rapidly solidified. However, in FIGS. 1, 5, and 6, the temperature of the pressing unit is about 150° C. to about 250° C. so that the driving chip 300 is securely attached to the NCF 400, and the resin of the NCF 400 may not be too rapidly solidified.

In the main-pressing process of step S30, a temperature of the display panel 200 may be about 40° C. to about 90° C.

If the temperature of the display panel 200 is more than about 90° C., then a glass substrate and liquid crystals of the display panel 200 may become deformed. However, in FIGS. 1, 5, and 6, the temperature of the display panel 200 is about 40° C. to about 90° C. to prevent a deformation of the glass substrate and liquid crystals of the display panel 200.

According to the present invention, the driving chip includes the bumps having the insulating layer and the metal layer so that the driving chip is electrically connected to the display panel through the non-conductive adhesive film (NCF) that does not have conductive particles. Therefore, a manufacturing cost of the display device is decreased. In addition, the driving chip may not be electrically disconnected or electrically short-circuited with the display panel.

Furthermore, the bumps of the driving chip are formed in the circuit region corresponding to the driving circuit to decrease the size of the driving chip.

This invention has been described with reference to the exemplary embodiments. It is evident, however, that many alternative modifications and variations will be apparent to those having skill in the art in light of the foregoing description. Accordingly, the present invention embraces all such alternative modifications and variations as fall within the spirit and scope of the appended claims.

What is claimed is:

1. A display device comprising:
  a display panel including a pad member disposed on the display panel, the pad member having a plurality of conductive pads;
  a driving chip including:
    a body having a driving circuit; and
    a plurality of bumps protruded from the body and making face-to-face contact with the conductive pads, respectively; and
  a non-conductive adhesive film fixing the driving chip to the pad member,
  wherein each of the bumps comprises an insulating layer protruded from the body and a metal layer on the insulating layer, and
  wherein the driving chip comprises a circuit region corresponding to the driving circuit and a peripheral region surrounding the circuit region, and the driving chip further comprises:
    a pad layer electrically connected to the driving circuit in the body, and extended toward the peripheral region; and
    a metal line electrically connected between the pad layer and the metal layer.

2. The display device of claim 1, wherein the non-conductive adhesive film comprises a thermosetting resin.

3. The display device of claim 1, wherein an elasticity of the non-conductive adhesive film is about 1.0 GPa to about 6.0 GPa.

4. The display device of claim 1, wherein the driving chip comprises a circuit region corresponding to the driving circuit and a peripheral region surrounding the circuit region, and the bumps correspond to the circuit region.

5. The display device of claim 1, wherein the insulating layer comprises polyimide.

6. The display device of claim 1, wherein the metal layer comprises gold.

7. The display device of claim 1, wherein the metal line is electrically connected to the pad layer within the peripheral region.

8. The display device of claim 1, wherein the driving chip further comprises a connecting layer between the pad layer and the metal line.

9. The display device of claim 1, wherein the driving chip further comprises a protecting layer covering a surface of the pad layer, the protecting layer including openings, the metal line connected to the pad layer through the openings in the protecting layer.

10. The display device of claim 1, wherein the display panel comprises:
  a first substrate electrically connected to the driving chip;
  a second substrate corresponding to the first substrate; and
  a liquid crystal layer interposed between the first and second substrates.

11. The display device of claim 1, wherein each of the bumps includes a substantially planar face and each of the conductive pads includes a substantially planar face making the face-to-face contact with the substantially planar face of each of the bumps.

12. The display device of claim 1, wherein the body is made of an insulating material and has a face facing the display panel, the plurality of bumps are protruded from the face of the body, and a space between the face of the body and the pad member filled with the non-conductive adhesive film.

13. A driving chip for a display device, the driving chip comprising:
  a body having a driving circuit in a circuit region of the driving chip; and,
  a plurality of bumps protruded from the body, each of the bumps including a metal layer in electrical contact with the driving circuit, each of the bumps located in the circuit region of the driving chip;

wherein electrical contact between the metal layer of each of the bumps and the driving circuit occurs in a peripheral region of the driving chip.

14. The driving chip of claim 13, further comprising a pad layer electrically connected to the driving circuit in the circuit region, the pad layer extending into the peripheral region.

15. The driving chip of claim 14, further comprising a metal line connected to the metal layer of the bumps in the circuit region and extending to the peripheral region, the metal line connecting the metal layer to the pad layer within the peripheral region.

16. The driving chip of claim 15, further comprising a protecting layer covering a surface of the pad layer, the protecting layer including openings in the peripheral region, the metal line connected to the pad layer through the openings in the protecting layer.

17. The driving chip of claim 16, further comprising a connecting layer disposed between the pad layer and the metal line, the connecting layer located within the openings of the protecting layer.

18. The driving chip of claim 13, wherein the body is made of an insulating material and has a face, and the plurality of bumps are protruded from the face of the body.

19. The driving chip of claim 18, wherein each of the bumps has a substantially planar face substantially parallel to the face of the body.

20. The driving chip of claim 13, wherein each of the bumps includes an insulating layer within the metal layer of each of the bumps, the insulating layer made of an elastic material.

* * * * *